(12) United States Patent
Bonutti

(10) Patent No.: US 6,901,404 B1
(45) Date of Patent: May 31, 2005

(54) ACCESSING DISSEMINATION OF LITIGATION INFORMATION PUBLICALLY AVAILABLE COURTS OF LAW DATABASE OVER NETWORK

(75) Inventor: Peter M. Bonutti, Effingham, IL (US)

(73) Assignee: Bonutti 2003 Trust A, Effingham, IL (US)

( * ) Notice: Subject to any disclaimer, the term of this patent is extended or adjusted under 35 U.S.C. 154(b) by 0 days.

(21) Appl. No.: 09/476,156

(22) Filed: Dec. 30, 1999

(51) Int. Cl.$^7$ .............................................. G06F 17/30
(52) U.S. Cl. ........................... 707/102; 707/3; 707/10; 707/200; 705/1; 705/8; 709/203
(58) Field of Search ..................... 707/1–10, 100–102, 707/200–205, 500.1, 501.1, 525–526, 530, 511, 513; 709/203–205, 225–238; 705/1–3, 8–9

(56) References Cited

U.S. PATENT DOCUMENTS

| | | | | |
|---|---|---|---|---|
| 5,444,615 A | * | 8/1995 | Bennett et al. ................. | 705/8 |
| 5,813,009 A | * | 9/1998 | Johnson et al. .............. | 707/100 |
| 5,838,966 A | * | 11/1998 | Harlan ........................ | 345/866 |
| 5,875,431 A | * | 2/1999 | Heckman et al. ............. | 705/11 |
| 6,098,070 A | * | 8/2000 | Maxwell ...................... | 707/101 |
| 6,128,620 A | * | 10/2000 | Pissanos et al. ............ | 345/810 |
| 6,173,284 B1 | * | 1/2001 | Brown ......................... | 707/10 |
| 6,178,413 B1 | * | 1/2001 | Costin ........................... | 707/1 |
| 2001/0034731 A1 | * | 10/2001 | Simmons ..................... | 707/10 |

FOREIGN PATENT DOCUMENTS

| WO | WO97/41524 | * | 11/1997 | .................... | 17/60 |
|---|---|---|---|---|---|

OTHER PUBLICATIONS

Lexis.Nexis–Learning Lexis–A handbook for modern legal research , 1998 pp. 12,20,36,31–33,35–37,4750,54.*

TJ Becker On–line justice, database provides bigger picture for court officials, Research horizons, Georgia Institute of Technology, total 4 pages, last updated on Jun. 30, 1998.*

Electronic public access to court recordsx, Legal technology institute, University of Florida, Levin College of Law, Fall 1999, pp. 1–43.*

Legal research refresher, database and cost effective searching tips May 2002, total p. 2.* www.supremecourtus.gov/docket/docket.html, Sep. 21, 2001, one page.*

Joachim et al., dockets: a model for adding value to content, www.sts.tu–harburg.de, pp.: 15.* www.inslawinc.com/techno, 4 pages.* www.Ilrx.com 3 pages.* www.courtlink.com, 2 pages and www.courts.net, 4 pages.*

Internet publication entitled "PublicData.com", copyright 1998 PublicData.com, 18 pgs. www.publicdata.com, applicant printed on Jan. 13, 2000.

\* cited by examiner

*Primary Examiner*—Srirama Channavajjala
(74) *Attorney, Agent, or Firm*—Fleit Kain Gibbons Gutman Bongini & Bianco; Paul D. Bianco; Martin Fleit

(57) ABSTRACT

Information concerning criminal and/or civil litigation pending in a plurality of courts of law is disseminated by periodically reviewing records in a plurality of courts of law. The courts of law may be in a plurality of states and may be federal and/or state courts. Data obtained from the records in each of the plurality of courts is transmitted to a database. The database is accessed with terminals which communicate with the database by a network, such as the Internet. Data relating to the criminal and/or civil lawsuits is transmitted from the database to the terminals which access the database. The data relating to the lawsuits may include data indicating the identity of plaintiffs and defendants, data indicating the identity of the attorney or attorneys filing the lawsuits, data indicating the cause of action of the lawsuits, and/or data indicative of the disposition of the lawsuits.

47 Claims, 4 Drawing Sheets

ACCESSING DISSEMINATION OF LITIGATION INFORMATION PUBLICALLY AVAILABLE COURTS OF LAW DATABASE OVER NETWORK

BACKGROUND OF THE INVENTION

The present invention relates to a new and improved method of disseminating information relating to criminal and/or civil litigation pending in a plurality of courts of law.

There are numerous texts which contain reports on criminal and/or civil lawsuits decided in state or federal courts. However, many of the cases which are filed in state or federal courts are not reported in published texts. Even if a particular case is reported in a published text, the text may be published years after the case is initially filed with the court.

Many different people have many different reasons for wanting to know about litigation. For example, an employer may want to know whether or not a potential employee has been involved in either criminal or civil litigation. A person in the process of selecting an attorney to represent him in bringing a particular cause of action may want to know whether or not a particular attorney has experience relating to cases for that cause of action. A person comparing two attorneys to determine which attorney could best represent him may want to know the relationship between the number of lawsuits which each attorney files and the number of times the attorney either settles or wins the lawsuits.

SUMMARY OF THE INVENTION

The present invention relates to a new and improved method of disseminating information relating to litigation pending in a plurality of courts of law. The method includes transmitting data relating to criminal and/or civil lawsuits filed in each of a plurality of courts of law to a database. The data may be electronically or manually transmitted to the database. The database is accessed with terminals which communicate with the database by a network. Data relating to the lawsuits is transmitted from the database to the terminals which access the database.

It is contemplated that the data which is transmitted to and from the database may relate to different aspects of lawsuits filed In a plurality of courts of law. For example, the data could identify plaintiffs and defendants, the cause of action, the identity of the attorneys filing each of the lawsuits, the identity of any expert witnesses, and/or the eventual disposition of the lawsuit.

The data which is transmitted to the database may relate to state and/or federal courts of law. The data may relate to-all courts of law within-a state or to just some of the courts of law within a state. It is contemplated that it will probably be desirable to have data for all courts of law within a plurality of states transmitted to the database. The database may determine a numerical relationship between various aspects of the data.

BRIEF DESCRIPTION OF THE DRAWINGS

The foregoing and other objects and features of the invention will become more apparent upon a consideration of the following description taken in connection with the accompanying drawings wherein.

DESCRIPTION OF PREFERRED EMBODIMENTS OF THE INVENTION

Figure 1:
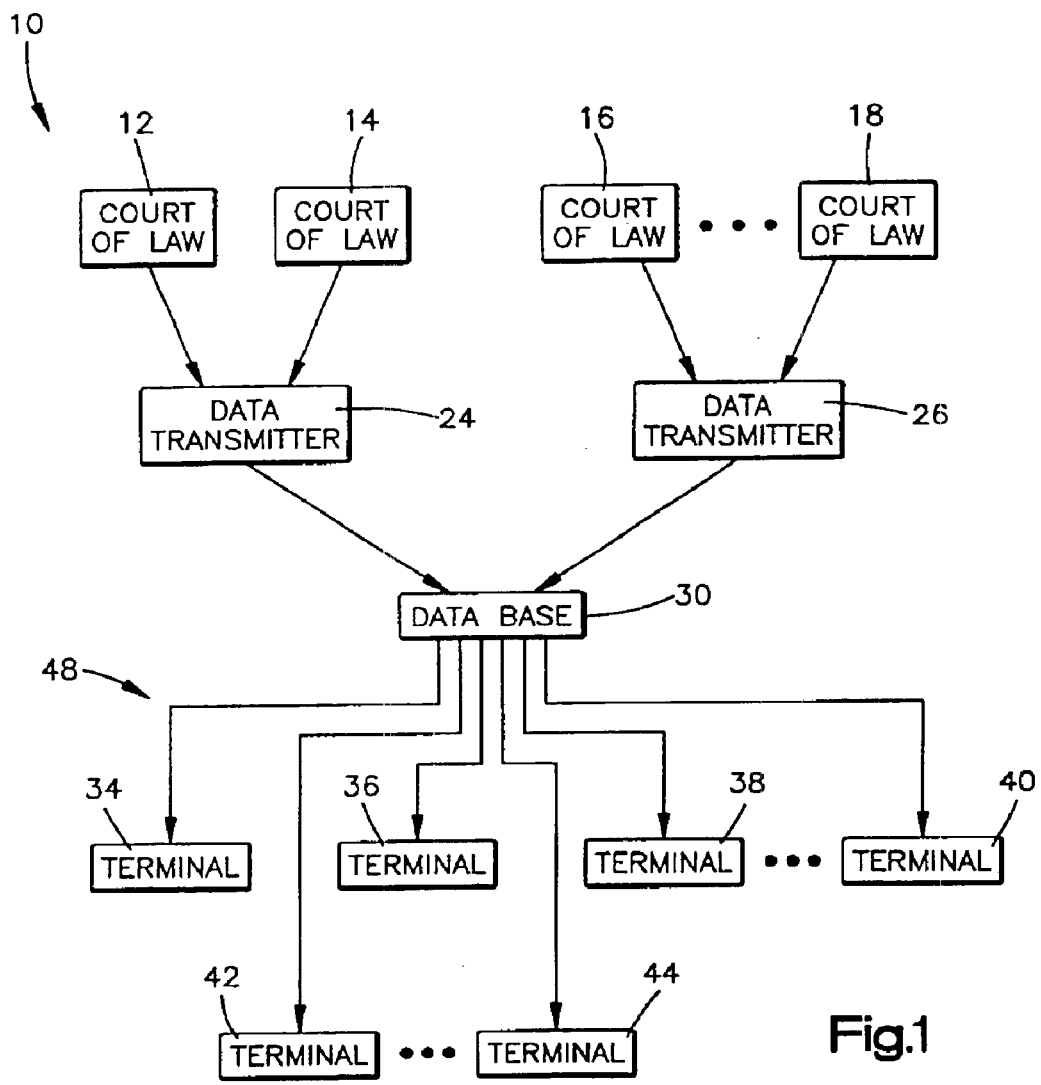
FIG. 1 is a schematic illustration depicting the relationship of a plurality of courts of law to data transmitters, a database and computer terminals which access the database.

A system 10 for disseminating information relating to criminal and/or civil litigation pending in a plurality of courts of law, indicated by the numerals 12, 14, 16 and 18, as illustrated schematically in FIG. 1. Although only four courts of law 12–18 have been indicated schematically in FIG. 1, it is contemplated that a greater number of courts of law will be included In the system 10. For example, it is contemplated that all of the state and/or federal courts within a plurality of the states of the United States of America could be included in the system. In fact, it is contemplated that all of the courts of law in the United States of America could be included in the system 10.

Although it is believed that it will be preferred to have the system 10 include all of the state and federal courts within a plurality, if not all, of the states of the United States of America, the system 10 could be limited to courts of law in only one particular state or to courts of law in only a portion of one particular state. Alternatively, the system 10 could be limited to just a few of the courts of law in a plurality of states or to a few courts of law within a portion of a state. For example, the system 10 may initially be limited to state courts of law in a southern portion of a state and gradually expand to state courts of law in a northern portion of the state. As the system 10 is expanded, federal courts of law in the southern and/or northern portion of the state could be added to the system. As the system 10 continues to grow, state courts of law and/or federal courts of law in adjacent states could be added to the system. Although it is believed that it will be desirable to add all of the state and federal courts within each of the states included within the system 10, only a portion of the state and/or federal courts within a state could be included in the system 10.

Data transmitters 24 and 26 are provided to transmit data from the courts of law to a database 30. Although only two data transmitters 24 and 26 have been illustrated schematically in FIG. 1, it is contemplated that a larger number of data transmitters will be included in the system 10. For example, it is contemplated that one data transmitter could be provided for each of the courts of law. The data transmitters 24 and 26 transmit data relating to lawsuits pending in each of the courts 12, 14, 16 and 18 to the database 30.

Although a single database 30 has been illustrated schematically in FIG. 1, it is contemplated that a plurality of databases may be provided. The databases may be interconnected to enable data to be transmitted between the databases. Thus, a plurality of databases 30 may be provided for each of a plurality of groups of courts of law.

The database 30 is connected with a plurality of terminals 34, 36, 38, 40, 42 and 44. Although only five terminals have been illustrated schematically in FIG. 1, it is contemplated that a greater number of terminals will be connected with the database 30. The terminals 34–44 may be at a plurality of locations in every state of the United States of America.

The terminals 34–44 are connected with the database 30 by a network 48. In the illustrated embodiment of the Invention, the network 48 is a global communication network, that is, the Internet. However, a different network could be utilized if desired.

When a lawsuit is first filed with a court of law by an attorney who is in private practice, an attorney who is employed by a governmental unit, or a corporate attorney, the complaint filed with the court Indicates relevant data relative to the criminal or civil lawsuit. For example, the complaint may indicate the identity of the plaintiff, the identity of the defendant, the identity of the attorney or attorneys filing the lawsuit, and the cause of action to which the complaint relates. The information filed with each lawsuit in each of the courts 12–18 is available to the public.

For example, when an attorney who is a prosecutor files a lawsuit on behalf of a governmental body which is a plaintiff against an alleged criminal who is a defendant, the identity of the attorney, plaintiff, and defendant and the nature of the cause of action are usually publicly available. Similarly, when an attorney files a lawsuit against a defendant who allegedly injured the plaintiff, the identity of the attorney, plaintiff, and defendant and the nature of the cause of action are usually publicly available. When a lawsuit is terminated or disposed of, the terms of any jury verdict, judges' decision, or settlement may be publicly available.

When a lawsuit is terminated, information regarding the disposition of the lawsuit is also publicly available. Thus, jury verdicts and court decisions terminating lawsuits are usually publicly available. If a lawsuit is settled by agreement between the parties, the details of the agreement may not be publicly available. However, the fact that there was a settlement is usually publicly available.

Data transmitters 24 and 26 are provided to transmit all data relating to the various lawsuits filed, continuing, or disposed of in each of the courts 12–18 to the database 30. The data transmitters 24 and 26 may be individuals who travel to the courts of law and review the records at the courts of law. Thus, the individual functioning as the data transmitter 24 would travel to the court 12 and obtain access to records relating to lawsuits filed and actions taken in pending lawsuits within a predetermined time period, for example, within the last month.

The individual functioning as the data transmitter 24 visually inspects the records and manually copies the information contained in the records. This results in the individual functioning as the data transmitter 24 obtaining all of the relevant information in regard to all of the lawsuits initiated, continuing or terminated within the time period, for example, within the last month, in the court 12.

The individual functioning as the data transmitter 24 would then hand deliver the data copied from records at the court 12 to the database 30. The information delivered by the individual functioning as a data transmitter 24 would be electronically entered into and stored in a memory at the database 30. The individual functioning as the data transmitter 24 may only transmit data relating to lawsuits filed or actions in pending lawsuits during a period of time in one court, for example the court 12, to the database 30. Alternatively, the individual functioning as the data transmitter 24 could transmit data relating to all of the lawsuits in a plurality of the courts, for example, the courts 12 and 14, to the database 30.

Another individual would function as the data transmitter 26. The individual functioning as the data transmitter 26 would review the records in a court, for example, the court 16, and manually copy the relevant information. The individual functioning as the data transmitter 26 would then hand deliver the relevant information to the database 30. The relevant information would then be entered into the database 30.

It is contemplated that a substantial number of individuals would be utilized as data transmitters. These individuals could be part-time workers, such as students or homemakers. Alternatively, the Individuals functioning as data transmitters could be employees of the courts who would review the court records outside of their normal working hours.

It is contemplated that the database 30 would include a terminal at which data gathered by each of the individuals functioning as the data transmitter, for example the data transmitters 24 and 26, would be entered into an electronic memory. Thus, the data conveyed to the database 30 by each of the individuals who functions as a data transmitter would be entered into the database and be accessible over the network 48.

The data conveyed to the database 30 by the data transmitters 24 and 26 would include most of the publicly available information in regard to each of the lawsuits pending in one of the courts 12–18. Thus, the data transmitted to the database 30 by the data transmitters 24 would include the names and address of the plaintiff and the defendant in each of the lawsuits. The name of the attorney representing the plaintiffs would be transmitted to the database 30. The cause of action for each of the lawsuits would also be transmitted to the database 30. The Identity of the judge to whom the lawsuit is assigned would also be transmitted to the database 30.

As each of the lawsuits filed in the courts 12–18 of law progresses, the identity of the attorney representing the defendant would become publicly available. In addition, the identity of expert witnesses used by the plaintiff and/or defendant would become publicly available. The subject matter on which the expert witnesses testify would also become a matter of public record. This information in regard to the identity of the defending attorney and the expert witnesses, as well as the subject matter about which the expert witnesses testify, would also be transmitted to the database by the data transmitters 24 and 26, When the lawsuit is terminated by settlement, jury verdict, decision of a judge, or other manner, this information would also be transmitted to the database 30. For example, if an individual charged with a crime is found to be not guilty, this Information would be transmitted to the database. Alternatively, facts would be transmitted to the database along with information concerning the punishment to which the defendant is subjected, such as a prison sentence and/or fine. The outcome of civil litigation, to the extent publicly available, would also be transmitted to the database 30. For example, a decision by either a judge or jury in regard to civil litigation would be transmitted to the database 30. If information in regard to a settlement between the parties is made part of the public record, this information would also be transmitted to the database 30 by the data transmitters 24 and 26.

The network 48 is connected with a plurality of terminals, indicated schematically at 34–44. The terminals 34–44 may be personal computers. The network 48 which connects the terminals 34–44 with the database 30 may be the Internet or global communication network. Alternatively, a more limited network could be provided between the database 30 and the terminals 34–44.

Individuals having a desire to obtain information relating to litigation pending or terminated in any of the courts 12–18 may access the database 30 through any one of the terminals 34–44. This will allow the individuals to obtain information relating to the identity of plaintiffs and/or defendants in all lawsuits filed within a period of time in all of the courts 12–18. In addition, the individuals can obtain information identifying the cause of action for each of the lawsuits and the attorney or attorneys who filed the lawsuits. When the case has been terminated, an individual at one of the terminals 34–44 can determine the disposition of the lawsuit. If a jury verdict is reached or a settlement is agreed to, the terms of the jury verdict or settlement to the extent publicly available, would also be available from the database 30.

The database 30 would use the data transmitted to the database by the data transmitters 24 and 26 to determine numerical relationships or ratios indicative of data contained within the database. For example, a numerical relationship between the number of lawsuits in which one specific attorney represented litigants and the number of lawsuits which were decided in favor of a litigant represented by the one attorney would be determined by the database. Similarly, the relationship of the number of lawsuits which one specific attorney settled to the total number of lawsuits in which the one specific attorney represented litigants could be determined. Similarly, the number of cases in which one is specific attorney represented plaintiffs and the number of cases in which the one attorney represented defendants to the total number of lawsuits in which the one attorney represented a litigant could be determined. This information would allow an individual in the process of selecting an attorney to compare the won, lost and settled ratios or performance numbers for various attorneys. It would also allow an individual who is in the process of selecting an attorney to determine whether or not the particular attorney primarily represented plaintiffs or defendants.

Since the database 30 contains data identifying the cause of action for each of the lawsuits, it is possible to determine the number of lawsuits which any one attorney has represented a litigant in regard to any specific type of action. For example, a determination could be made as to the number of times which an attorney has represented a litigant in regard to a medical malpractice action could be determined. Similarly, the number of times which an attorney had represented a litigant in regard to patent infringement could be determined. The outcome of the cases in which the attorney represented a litigant in regard to a specific cause of action could also be determined.

Since data in regard to all of the lawsuits and the cause of action of each lawsuit is transmitted to the database 30, the database can determine the numerical relationship between the number of lawsuits in which one specific attorney obtained a favorable outcome of the party to the lawsuit represented by the attorney for any one specific cause of action. For example, the database 30 could provide a numerical comparison between the number of patent or medical malpractice lawsuits in which an attorney obtained a favorable outcome for his client to the total number of the lawsuit of the specific type, that is, either medical malpractice or patent infringement, in which the attorney was involved. Of course, there are many other types of causes of action other than medical malpractice or patent infringement. The database 30 would contain data representative of the outcome of lawsuits for each of the various causes of action.

In addition to containing data in regard to attorneys, the database 30 would also contain data in regard to expert witnesses. The database 30 would contain data representative of the identify of expert witnesses and the type of cause of action in which the expert witnesses either assisted either a plaintiff or defendant. The database 30 would also contain information describing the subject matter of each expert witness' testimony.

Since the database 30 contains data representative of the outcome of all of the lawsuits in the courts 12–18 and As the causes of action for all of the lawsuits, the database 30 can provide a performance number for each of the expert witnesses. This performance number may be a ratio of the number of times in which an expert witness appeared for a litigant who obtained a favorable outcome to a lawsuit to the total number of lawsuits in which the expert witness was involved. The performance ratio for the expert witness could be based on any particular type of lawsuit. Thus, the database 30 may determine the number of patent infringement lawsuits for which one specific expert witness appeared for litigants who obtained a favorable result to the total number of patent infringement lawsuits in which the one specific expert witness appeared on behalf of any of the litigants.

An individual considering the selection of an expert witness for a particular cause of action, for example, patent infringement, could determine the number of times each of a plurality of expert witnesses had appeared in behalf of a plaintiff and/or defendant in a patent infringement lawsuit. In addition, an individual considering the selection of an expert witness could determine the number of times the expert witness had appeared in behalf of a litigant who obtained a favorable result in the litigation.

In addition to containing information concerning the identity of the plaintiff, defendants, attorneys, and expert witnesses, the database 30 would contain information in regard to the judges to whom the various lawsuits were assigned. The database 30 could determine the length of time which lawsuits for specific causes of action were pending before each of the judges in the courts 12–18. Thus, the database 30 could determine that for judge A, patent Infringement lawsuits would be pending for an average of four years, while for judge B patent infringement lawsuits would be pending for only an average of two years. Of course, the database 30 contains information regarding causes of action of many types other than patent infringement actions.

It is contemplated that data relating to lawsuits in both courts of original jurisdiction and appellant courts will be transmitted to the database 30 by the data transmitters 24 and 26. This will enable the database 30 to determine the number of appeals which are taken from each of the judges in the courts of original jurisdiction. The database 30 can also determine the outcome of the appeals. Thus, for any one judge in a court of original jurisdiction, the database 30 could determine the total number of appeals and the number of appeals in which the judge is either affirmed or reversed. Similarly, if an appeal is taken from a lower appellate court to a higher appellate court, the database 30 would contain information in order to enable the number of appeals from any one appellate court judge to a higher appellate court to be determined and the outcome of the appeals.

The foregoing description has assumed that the data transmitters 24 and 26 would be individuals who would go to each of the courts 12–18 and manually review the records in the courts to determine the relevant information. It is contemplated that the data transmitters 24 and 26 could electronically review electronically recorded data in the courts 12–18. Thus, the relevant data regarding a lawsuit filed in any one of the courts 12–18 would be entered into an electronic database at the court where the lawsuit is filed. An electronic data transmitter 24 or 26 would review the data recorded in the electronic database or memory at a court to determine the relevant information in regard to each of the lawsuits filed with the court during a period of time. The data transmitter 24 or 26 would then electronically transmit the data to the database 30.

Regardless of whether the records in the courts 12–18 are manually reviewed or are electronically reviewed to obtain data relating to lawsuits In each of the courts, the relevant data would be transmitted to the database 30 shortly after a lawsuit is filed, an action is taken in a pending lawsuit, or a lawsuit is terminated. This will allow individuals at the terminals 34–44 to quickly obtain relevant data in regard to all lawsuits filed with the courts 12–18.

In view of the foregoing description, it is apparent that the present invention provides a new and improved method of disseminating information relating to litigation pending in a plurality of courts 12–18 of law. The method includes transmitting data relating to criminal and/or civil lawsuits filed in each of a plurality of courts of law to a database. The data may be electronically or manually transmitted to the database. The database is accessed with terminals which communicate with the database by a network. Data relating to the lawsuits is transmitted from the database to the terminals which access the database.

It is contemplated that the data which is transmitted to and from the database may relate to different aspects of lawsuits filed in a plurality of courts of law. For example, the data could identify plaintiffs and defendants, the cause of action, the identity of the attorneys filing each of the lawsuits, the identity of expert witnesses, and/or the eventual disposition of the lawsuit.

The data which is transmitted to the database 30 may relate to state and/or federal courts of law. The data may relate to all courts of law within a state or to just some of the courts of law within a state. It is contemplated that it will probably be desirable to have data for all courts of law within a plurality of states transmitted to the database 30. The database 30 may determine a numerical relationship between various aspects of the data.

Figure 2:
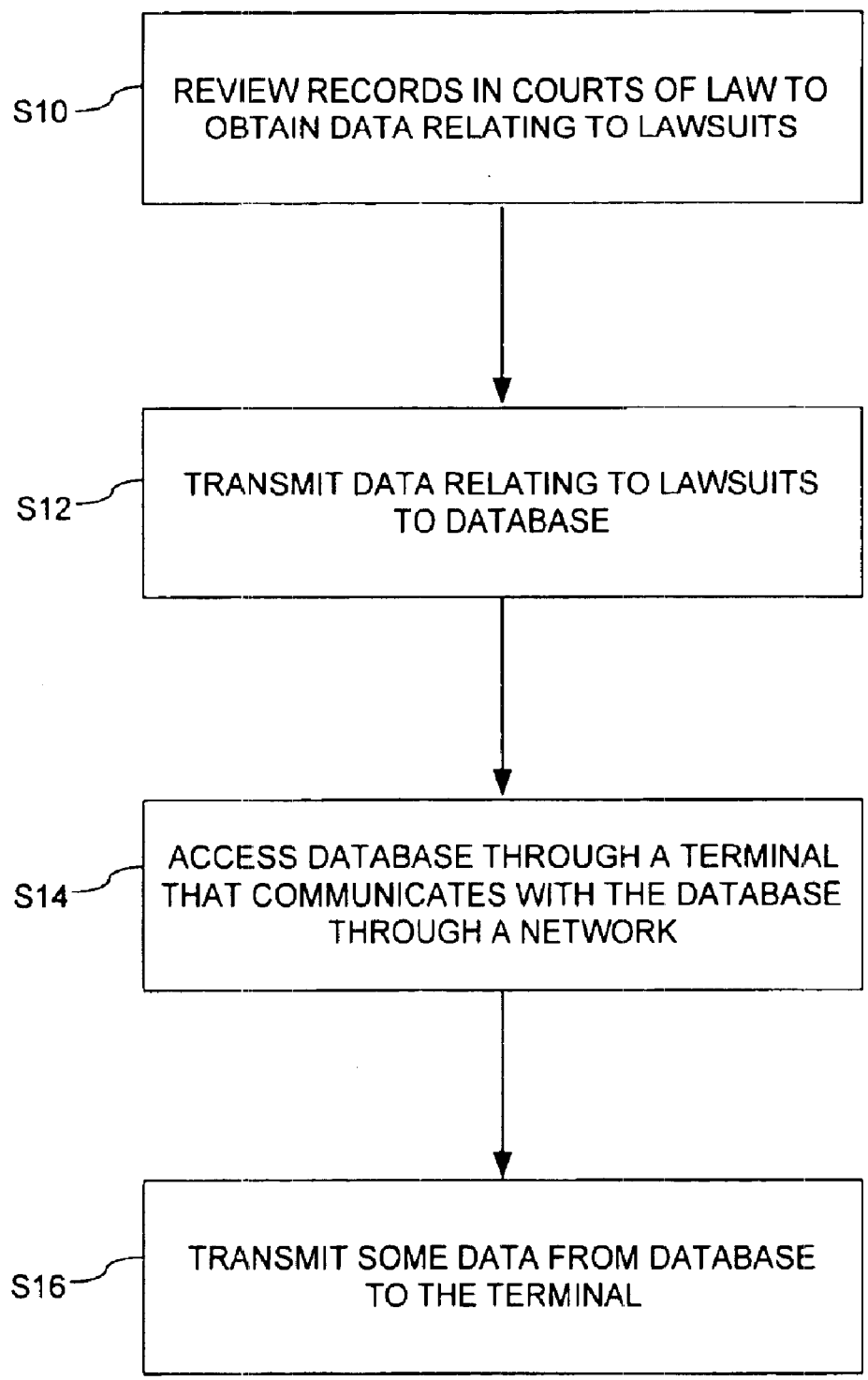
FIGS. 2–4 are schematic illustrations depicting data flows in accordance with embodiments of the present invention.
Figure 3:
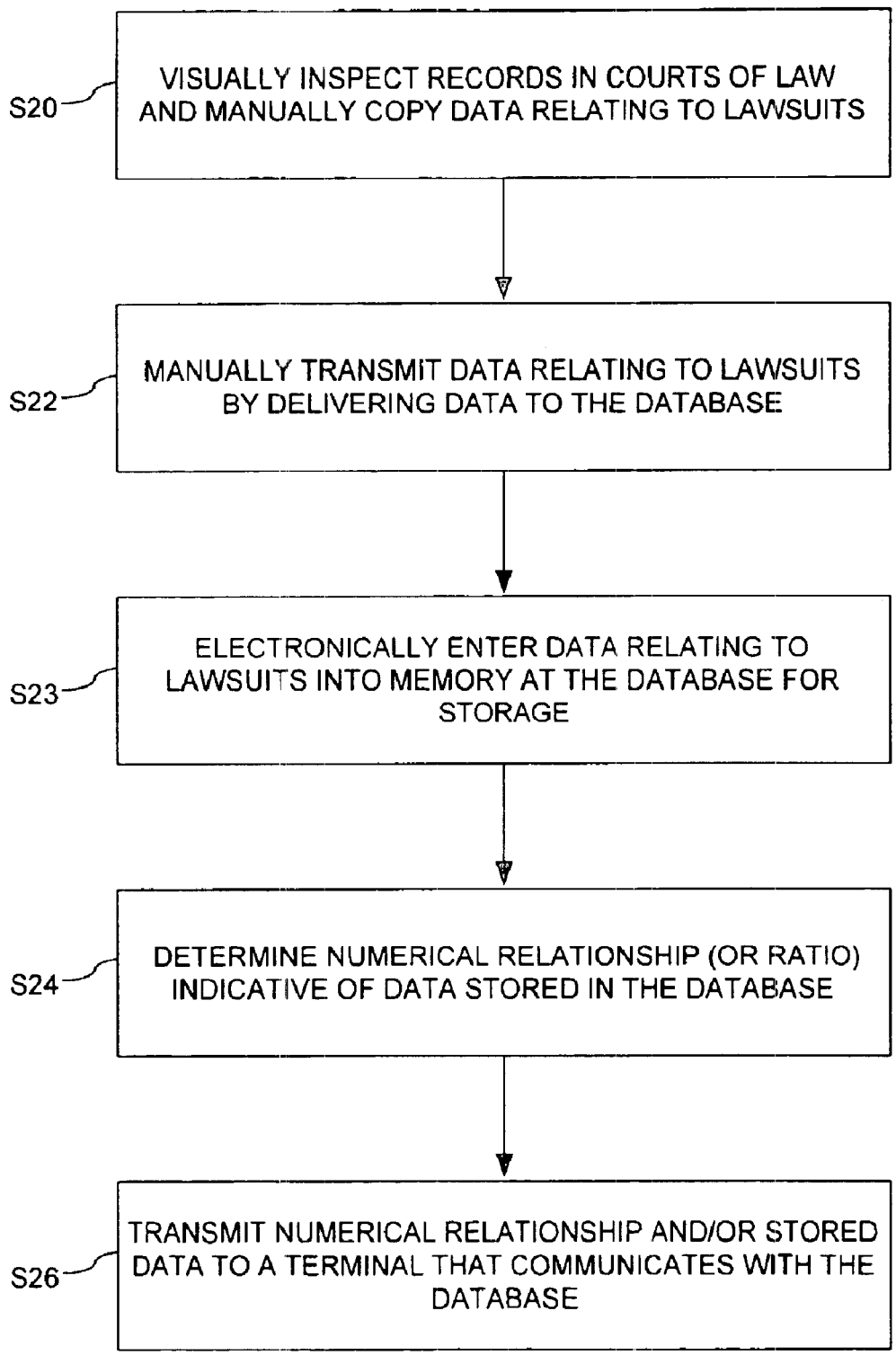
Figure 4:
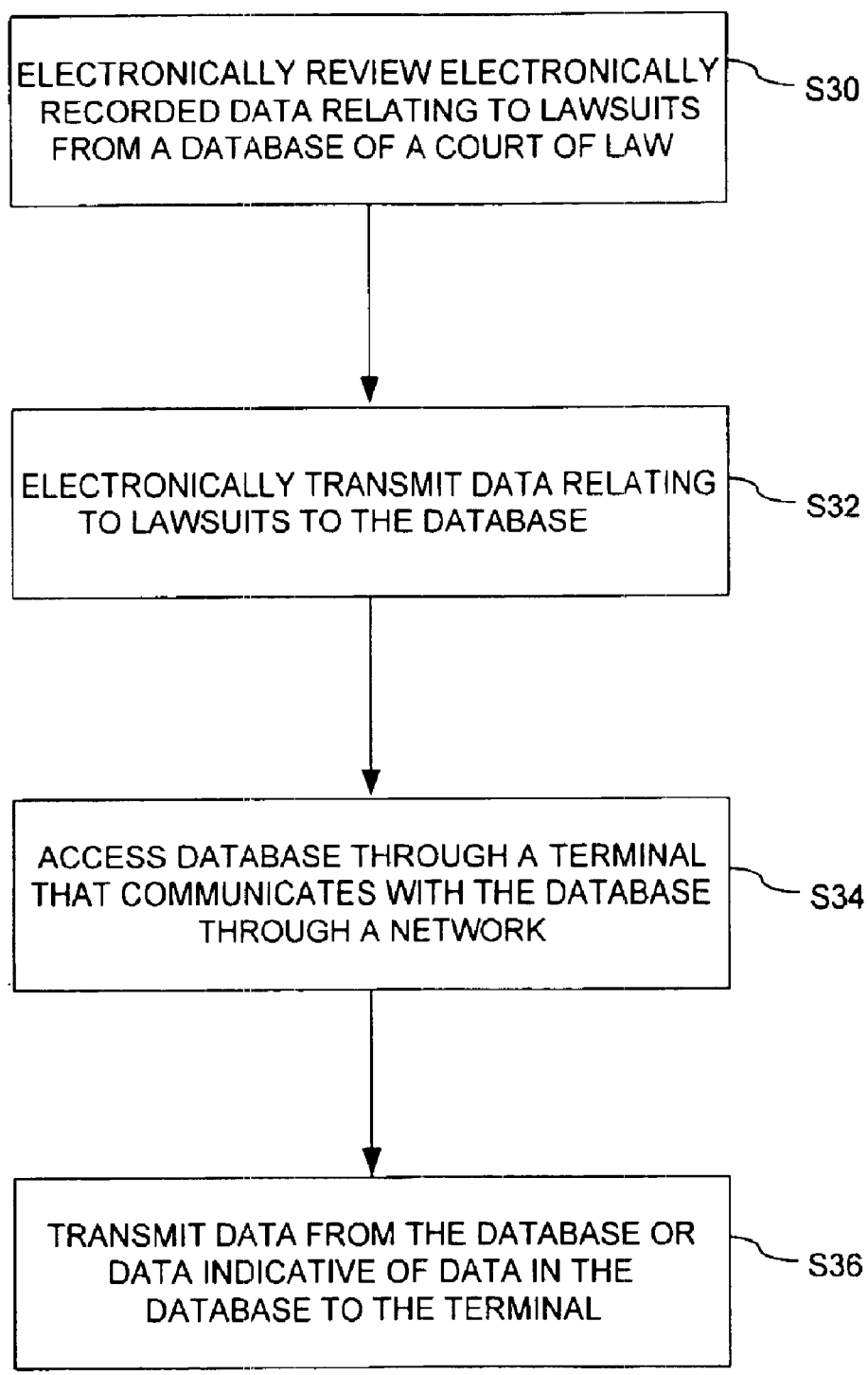

FIGS. 2–4 are schematic illustrations depicting data flows in accordance with embodiments of the present invention.

As shown in FIG. 2, a method according to an embodiment of the present invention for disseminating information relating to litigation pending in a plurality of courts of law includes the following steps. Records in a plurality of cots of law are periodically reviewed to obtain data relating to lawsuits filed in each of the plurality of courts of law (step S10), and the data obtained from the records in each court of law of the plurality of courts of law is transmitted to a database (step S12). The database is accessed with terminals which communicate with the database by a network (step S14), and at least a portion of the data is transmitted from the database over the network to the terminals which access the database (step S16).

As shown in FIG. 3, a method according to another embodiment for disseminating information relating to litigation pending in a plurality of courts of law includes the following steps. Records in each court of law of the plurality of courts of law are viewed and manually copied (step S20). The data copied from the records in each court of law is hand delivered to a database (step S22), and that data is electronically entered into and stored in a memory at the database (step S23). There is determined a numerical relationship or ratio indicative of the data in the database (step S24), and data indicative of the relationship is transmitted tom the database to a terminal (step S26).

As shown in FIG. 4, a method according to another embodiment for disseminating information relating to litigation pending in a plurality of courts of law includes the following steps. Records in a plurality of courts of law are periodically reviewed to electronically read data stored at each of the plurality of courts of law (step S30), and the data obtained from the records is electronically transmitted from each of the plurality of courts of law to the database (step S32). The database is accessed with terminals which communicate with the database by a network (step S34), and at least a portion of the data is transmitted from the database over the network to the terminal (step S36).

What is claimed is:

1. A method of disseminating information relating to litigation pending in a plurality of courts of law, said method comprising the steps of reviewing records in a plurality of courts of law to obtain data relating to lawsuits filed in each of the plurality of courts of law, said step of reviewing records in a plurality of courts of law includes determining the identify of the plaintiff, determining the identity of the defendant, determining the cause of action, and determining the identity of the attorney or attorneys filing the lawsuits, transmitting the data obtained from the records in each court of law of the plurality of courts of law to a database, said step of transmitting data obtained from the records in each court of law of the plurality of courts of law includes transmitting data indicate of the identity of the plaintiff, the identity of the defendant, the cause of action, and the identity of the attorney or attorneys filing the lawsuits, accessing the database with terminals which communicate with the database by a network, and transmitting at least a portion of the data from the database over the network to the terminals which access the database.

2. A method as set forth in claim 1 wherein said step of reviewing records in a plurality of courts of law includes determining the disposition of lawsuits filed in each court of law of the plurality of courts of law, said step of transmitting data obtained from the records in each court of law of the plurality of courts of law includes transmitting data indicative of the disposition of lawsuits filed in each court of law of the plurality of courts of law to the database.

3. A method as set forth in claim 1 further including the step of searching the database to determine the disposition of lawsuits filed by any one attorney in each court of law of the plurality of courts of law, said step of transmitting at least a portion of the data from the database to the terminals which access the database includes transmitting data indicative of the disposition of lawsuits filed by said one attorney in each court of law of the plurality of courts of law.

4. A method as set forth in claim 1 wherein said step of reviewing records in a plurality of courts of law includes visually reviewing and manually copying records in each court of law of the plurality of courts of law.

5. A method as set forth in claim 1 wherein said step of reviewing records in a plurality of courts of law includes electronically reading data stored at each court of law of the plurality of courts of law, said step of transmitting the data obtained from the records in each court of law of the plurality of courts of law includes electronically transmitting data to a data storage device.

6. A method as set forth in claim 1 further including the steps of determining a relationship between a number corresponding to the number of lawsuits in which one attorney represented litigants in a plurality of courts of law and a number corresponding to the number of lawsuits decided in favor of a litigant represented by the one attorney in the plurality of courts of law, and transmitting data from the database to at least one of the terminals indicative of the relationship between the number of lawsuits in which the one attorney represented litigants in the plurality of courts of law and the number of lawsuits decided in favor of litigants represented by the one attorney in the plurality of courts of law.

7. A method as set forth in claim 1 further including the steps of determining a relationship between a number corresponding to the number of lawsuits in which one attorney represented plaintiffs in a plurality of courts of law and a number corresponding to the number of lawsuits decided in favor of plaintiffs represented by the one attorney in the plurality of courts of law, and transmitting data from the database to at least one of the terminals indicative of the relationship between the number of lawsuits in which the one attorney represented plaintiffs in the plurality of courts law and the number of lawsuits decided in favor of a plaintiff represented by the one attorney in the plurality of courts of law.

8. A method as set forth in claim 1 further including the steps of determining a relationship between a number corresponding to the number of lawsuits in which one attorney represented defendants in a plurality of courts of law and a number corresponding to the number of lawsuits decided in favor of defendants represented by the one attorney in the plurality of courts of law, and transmitting data from the database to at least one of the terminals indicative of the relationship between the number of lawsuits in which the one attorney represented defendants in the plurality of courts of law and the number of lawsuits decided in favor of defendants represented by the one attorney in the plurality of courts of law.

9. A method as set forth in claim 1 further including the steps of determining a number corresponding to the number of lawsuits in which one law firm represented litigants in a plurality of courts of law and a number corresponding to the number of lawsuits decided in favor of litigants represented by the one law firm in the plurality of courts of law, and transmitting data from the database to at least one of the terminals indicative of the relationship between the number of lawsuits in which the one law firm represented litigants in the plurality of courts of law and the number of lawsuits decided in favor of a litigant represented by the one law firm in the plurality of courts of law.

10. A method as set forth in claim 1 further including the steps of determining a relationship between a number corresponding to the number of lawsuits in which one law firm represented plaintiffs in a plurality of courts of law and a number corresponding to the number of lawsuits decided in favor of plaintiffs represented by the one law firm in the plurality of courts of law, and transmitting data from the database to at least one of the terminals indicative of the relationship between the number of lawsuits in which the one law firm represented plaintiffs in the plurality of courts of law and the number of lawsuits decided in favor of a plaintiff represented by the one law firm in the plurality of courts of law.

11. A method as set forth in claim 1 further including the steps of determining a relationship between a number corresponding to the number of lawsuits in which one law firm represented defendants in a plurality of courts of law and a number corresponding to the number of lawsuits decided in favor of defendants represented by the one law firm in the plurality of courts of law, and transmitting data from the database to at least one of the terminals indicative of the relationship between the number of lawsuits in which the one law firm represented defendants in the plurality of courts of law and the number of lawsuits decided in favor of defendants represented by the one law firm in the plurality of courts of law.

12. A method as set forth in claim 1 further including the steps of determining a relationship between a number corresponding to the number of lawsuits relating to one specific type of cause of action in which one attorney represented litigants in a plurality of courts of law and a number corresponding to the number of lawsuits relating to the one specific type of cause of action and decided in favor of litigants represented by the one attorney in the plurality of courts of law, and transmitting data from the database to at least one of the terminals indicative of the relationship between the number of lawsuits relating to the one specific type of cause of action and in which the one attorney represented litigants in the plurality of courts of law and the number of lawsuits relating to the one specific type of cause of action and which were decided in favor of litigants represented by the one attorney in the plurality of courts of law.

13. A method as set forth in claim 1 further including the steps of determining a relationship between a number corresponding to the number of lawsuits relating to one specific cause of action in which one attorney represented plaintiffs in a plurality of courts of law and a number corresponding to the number of lawsuits relating to the one specific type of cause of action and decided in favor of plaintiffs represented by the one attorney in the plurality of courts of law, and transmitting data from the database to at least one of the terminals indicative of the relationship between the number of lawsuits relating to the one specific type of cause of action and in which the one attorney represented plaintiffs in the plurality of courts of law and the number of lawsuits relating to the one specific type of cause of action and which were decided in favor of plaintiffs represented by the one attorney in the plurality of courts of law.

14. A method as set forth in claim 1 further including the steps of determining a relationship between a number corresponding to the number of lawsuits relating to the one specific type of cause of action in which one attorney represented defendants in a plurality of courts of law and a number corresponding to the number of lawsuits relating to the one specific type of cause of action and decided in favor of defendants represented by the one attorney in the plurality of courts of law, and transmitting data from the database to at least one of the terminals indicative of the relationship between the number of lawsuits relating to the one specific type of cause of action and in which the one attorney represented defendants in the plurality of courts of law and the number of lawsuits relating to the one specific type of cause of action and which were decided in favor of defendants represented by the one attorney in the plurality of courts of law.

15. A method as set forth in claim 1 further including the steps of determining the number of lawsuits in which any one attorney represented a litigant in any one of a plurality of courts of law and which resulted in a decision by a judge or a jury, determining the number of lawsuits in which the one attorney represented a litigant in any one of the plurality of courts of law and which resulted in a decision by a judge or a jury favorable to a litigant represented by the one attorney, determining a relationship between the number of lawsuits in which the one attorney represented a litigant and which resulted in a decision by a judge or a jury and the number of lawsuits in which the one attorney represented a litigant and which resulted in a decision by a judge or a jury favorable to a litigant represented by the one attorney, and transmitting data from the database to at least one of the terminals indicative of the relationship between the number of lawsuits in which the one attorney represented a litigant and which resulted in a decision by a judge or a jury and the number of lawsuits in which the one attorney represented a litigant and which resulted in a decision by a judge or a jury favorable to a litigant represented by the one attorney.

16. A method as set forth in claim 1 further including the steps of determining a total number of lawsuits filed by one attorney in a plurality of courts of law and the number of lawsuits settled by litigants represented by the one attorney, determining a relationship between the total number of lawsuits filed by the one attorney and the number of lawsuits settled by litigants represented by the one attorney, and transmitting data from the database to at least one of the terminals indicative of the relationship between the number of lawsuits filed by the one attorney and the number of lawsuits settled by litigants represented by the one attorney.

17. A method as set forth in claim 1 further including the steps of determining the number of lawsuits relating to each of a plurality of different causes of action filed by one attorney, determining the number of lawsuits decided in favor of litigants represented by the one attorney for each cause of action of the plurality of causes of action, and transmitting data from the database to at least one of the terminals indicative of the number of lawsuits relating to each cause of action of the plurality of causes of action filed by the one attorney of the plurality of attorneys and the number of lawsuits decided in favor of litigants represented by the one attorney for each cause of action of the plurality of causes of action.

18. A method as set forth in claim 1 further including the step of determining the average length of time lawsuits filed by one attorney are pending in a court of law before being terminated for each of a plurality of different causes of action, and transmitting data from the database to at least one of the terminals indicative of the length of time lawsuits filed by the one attorney are pending in a court of law before being terminated for each of the plurality of different causes of action.

19. A method as set forth in claim 1 further including the steps of determining the number of lawsuits which were appealed from a lower court to a higher court and which involved a litigant represented by one attorney, determining the number of appeals which were decided by a higher court in favor of a litigant represented by the one attorney, and transmitting data from the database to at least one of the terminals indicative of the number of lawsuits which were appealed from a lower court to a higher court and involved the one attorney and the number of appeals which were decided in favor of a litigant represented by the one attorney.

20. A method as set forth in claim 1 further including the step of determining the number of lawsuits which were appealed from a lower court to a higher court and which involved one specific type of cause of action and a litigant represented by one law firm, determining the number of appeals which related to the one specific type of cause of action and were decided by a higher court in favor of a litigant represented by the one law firm, determining a relationship between the number of lawsuits which were appealed from a lower court to a higher court and which involved the one specific type of cause of action and a litigant represented by the one law firm, and the number of appeals which related to the one specific type of cause of action and were decided by a higher court in favor of a litigant represented by the one law firm, and transmitting data from the database to at least one of the terminals indicative of the relationship between the number of lawsuits which related to the one specific type of cause of action and were appealed from a lower court to a higher court and which involved a litigant represented by the one law firm and the number of appeals which related to the one specific type of cause of action and were decided by a higher court in favor of a litigant represented by the one law firm.

21. A method as set forth in claim 1 further including the steps of determining the relationship between a number of lawsuits decided in favor of a plaintiff by each judge of a plurality of judges in each of a plurality of courts of law to a number of lawsuits decided by each judge of the plurality of judges, and transmitting data from the database to at least one of the terminals indicative of the relationship between the number of lawsuits decided in favor of a plaintiff by each judge of a plurality of judges in each of a plurality of courts of law to the number of lawsuits decided by each judge of the plurality of judges.

22. A method as set forth in claim 1 further including the steps of determining the relationship between a number of lawsuits decided in favor of a defendant by each judge of a plurality of judges in each of a plurality of courts of law to a number of lawsuits decided by each judge of the plurality of judges, and transmitting data from the database to at least one of the terminals indicative of the relationship between the number of lawsuits decided in favor of a defendant by each judge of a plurality of judges in each of a plurality of courts of law to the number of lawsuits decided by each judge of the plurality of judges.

23. A method as set forth in claim 1 further including the steps of determining a relationship between a number of lawsuits which were appealed from each judge of a plurality of judges in each of a plurality of courts to a number of appeals in which each judge of the plurality of judges was affirmed by an appellate court, and transmitting data from the database to at least one of the terminals indicative of the relationship between the number of lawsuits which were appealed from each judge of the plurality of judges to the number of appeals in which each judge of the plurality of judges was affirmed by the appellate court.

24. A method as set forth in claim 1 further including the steps of determining the relationship between a number of lawsuits settled before trial by each judge of a plurality of judges in each of a plurality of courts of law to a number of lawsuits assigned to each judge of the plurality of judges, and transmitting data from the database to at least one of the terminals indicative of the relationship between the number of lawsuits assigned to each judge of the plurality of judges and the number of lawsuits settled before trial by each judge of the plurality of judges.

25. A method as set forth in claim 1 further including the steps of determining the identity of expert witnesses for each of a plurality of different causes of action in a plurality of courts, and transmitting data from the database to at least one of the terminals indicative of the identity of expert witnesses for each cause of action of the plurality of different causes of action in each of the plurality of courts.

26. A method as set forth in claim 1 further including the steps of determining the identity of expert witnesses for each of a plurality of different causes of action in a plurality of different courts, determining the number of lawsuits which resulted in favorable decisions for a litigant assisted by each expert witness, and transmitting data from the database to at least one of the terminals indicative of the identity of expert witnesses for each cause of action of the plurality of causes of action and the number of lawsuits which resulted in favorable decisions for a litigant assisted by each expert witness.

27. A method as set forth in claim 1 further including the steps of determining the number of appeals from lower court decisions to each of a plurality of appeal courts, determining the outcome of appeals from lower court decisions to each of the plurality of appeal courts, and transmitting data from the database to at least one of the terminals indicative of the relationship of the number of appeals to each of the appeal courts to the outcome of the appeals to each of the plurality of appeal courts.

28. A method as set forth in claim 1 further including the steps of determining the number of appeals to a plurality of appeal courts from a plurality of lower court decisions for each of a plurality of causes of action, determining the number of appeals which were affirmed by each appeal court of the plurality of appeal courts for each cause of action of the plurality of causes of action, and transmitting from the database to at least one of the terminals of the plurality of terminals data which is a function of the number of appeals from lower court decisions for each of a plurality of causes of action and the number of appeals which were affirmed by each appeal court of the plurality of appeal courts for each of the plurality of causes of action.

29. A method as set forth in claim 1 further including the step of determining the number of appeals to a plurality of appeal courts from a plurality of lower court decisions for each of a plurality of causes of action, determining the number of appeals which were reversed by each appeal court of the plurality of appeal courts for each cause of action of the plurality of causes of action, and transmitting from the database to at least one of the terminals of the plurality of terminals data which is a function of the number of appeals from lower court decisions for each of a plurality of causes of action and the number of appeals which were reversed by each appeal court of the plurality of appeal courts for each of the plurality of causes of action.

30. A method as set forth in claim 1 wherein said step of transmitting data includes transmitting data relating to lawsuits filed within a period of time in each of a plurality of courts of law in each of a plurality of states of the United States of America to the database.

31. A method as set forth in claim 1 wherein said step of reviewing records a plurality of courts of law includes reviewing records in both state and federal courts, said step of transmitting data includes transmitting data relating to both federal and state courts.

32. A method as set forth in claim 1 wherein said step of transmitting data includes electronically reading data stored at each court of the plurality of courts in each of a plurality of states of the United States of America and electronically transmitting data from each of the courts of the plurality of courts to the database.

33. A method as set forth in claim 1 wherein said step of transmitting data includes viewing and manually copying records in each court of the plurality of courts in each of a plurality of states of the United States of America.

34. A method as set forth in claim 1 said step of transmitting data includes transmitting data relating to lawsuits filed in state and federal courts in at least a portion of at least one state of the United States of America to the database.

35. A method of disseminating information relating to litigation pending in a plurality of courts of law, said method comprising the steps of reviewing records in a plurality of courts of law to obtain data relating to lawsuits filed in each of the plurality of courts of law, said step of reviewing records in a plurality of courts of law includes determining the identity of expert witnesses and the causes of action in regard to which the expert witnesses testified, transmitting the data obtained from the records in each court of law of the plurality of courts of law to a database, said step of transmitting data obtained from the records in each court of law of the plurality of courts of law includes transmitting data indicative of the identity of the expert witnesses and the causes of action in regard to which the expert witnesses testified, accessing the database with terminals which communicate with the database by a network, and transmitting at least a portion of the data from the database over the network to the terminals which access the database.

36. A method ass et forth in claim 35 wherein said step of reviewing records in a plurality of courts of law includes determining the identity of the plaintiff, the identity of the defendant, and the cause of action for each of the lawsuits filed in the plurality of courts of law, said step of transmitting data obtained from the records in each court of law of the plurality of courts of law includes transmitting data indicative of the identity of the plaintiff, the identity of the defendant and the cause of action for lawsuits filed in the plurality of courts of law to the database.

37. A method as set forth in claim 35 wherein said step of reviewing records in a plurality of courts of law includes determining the disposition of lawsuits filed in each court of law of the plurality of courts of law, said step of transmitting data obtained from the records in each court of law of the plurality of courts of law includes transmitting data indicative of the disposition of lawsuits filed in each court of law of the plurality of courts of law to the database.

38. A method as set forth in claim 35 wherein said step of reviewing records in a plurality of courts of law includes determining the identity of the attorney or attorneys filing lawsuits and the cause of action for lawsuits in each court of law of the plurality of courts of law, said step of transmitting data obtained from the records in each court of law of the plurality of courts of law includes transmitting data indicative of the identity of the attorney or attorneys filing lawsuits and the causes of action for lawsuits filed in each of the plurality of courts of law to the database.

39. A method as set forth in claim 38 wherein said step of reviewing records in a plurality of courts of law includes determining the disposition of lawsuits filed in each court of law of the plurality of courts of law, said step of transmitting data obtained from the records in each court of law of the plurality of courts of law includes transmitting data indicative of the disposition of lawsuits filed in each court of law of the plurality of courts of law to the database.

40. A method as set forth in claim 39 further including the step of searching the database to determine the disposition of lawsuits filed by any one attorney in each court of law of the plurality of courts of law, said step of transmitting at least a portion of the data from the database to the terminals which access the database includes transmitting data indicative of the disposition of lawsuits filed by said one attorney in each court of law of the plurality of courts of law.

41. A method as set forth in claim 35 wherein said step of reviewing records in a plurality of courts of law includes reviewing and manually copying records in each court of law of the plurality of courts of law.

42. A method as set forth in claim 35 wherein said step of reviewing records in a plurality of courts of law includes electronically reading data stored at each court of law of the plurality of courts of law, said step of transmitting the data obtained from the records in each court of law of the plurality of courts of law includes electronically transmitting data to a data storage device.

43. A method as set forth in claim 35 wherein said step of transmitting data includes transmitting data indicative of whether or not an expert witness testified in behalf of a litigant who received a favorable decision in the litigation in which the expert witness testified.

44. A method as set forth in claim 35 wherein said steps of determining a relationship between a number corresponding to the number of lawsuits in which one expert witness testified and a number corresponding to the number of lawsuits in which the one expert witness testified and which were decided in favor of a litigant on whose behalf the one expert witness testified, and transmitting data from the database to at least one of the terminals indicative of the relationship between the number of lawsuits in which the one expert witness testified and the number of lawsuits in which the one expert witness testified and which were decided in favor of a litigant on whose behalf the one expert witness testified.

45. A method of disseminating information related to litigation pending in a plurality of courts of law, said method comprising the steps of:

reviewing documents filed in a plurality of courts of law to obtain publicly available data relating to lawsuits filed in each court of law of the plurality of the courts of law;

transmitting the publicly available data obtained from the documents filed in the plurality of the courts of law to a database;

receiving a request for data from a terminal that accesses the database over a network; and transmitting at least a portion of the data from the database over the network to the terminal, wherein the documents are filed by the parties to the lawsuits.

46. A method as set forth in claim 45 wherein the documents include complaints, answers, and motions filed by the parties.

47. A method as set forth in claim 45 wherein the documents include complaints, answers and motion filed by the parties.

* * * * *

UNITED STATES PATENT AND TRADEMARK OFFICE
CERTIFICATE OF CORRECTION

PATENT NO.    : 6,901,404 B1
DATED         : May 31, 2005
INVENTOR(S)   : Peter M. Bonutti It is certified that error appears in the above-identified patent and that said Letters Patent is hereby corrected as shown below:

Column 8,
Lines 9-35, rewrite claims 1 and 2 as follows:

1. A method of disseminating information relating to litigation in a plurality of courts of law, said method comprising the steps of:
reviewing court records of a plurality of courts of law to obtain publicly available data relating to lawsuits filed in each of the plurality of courts of law, said step of reviewing court records of a plurality of courts of law includes determining the identify of the plaintiff, determining the identity of the defendant, determining the cause of action, and determining the identity of the attorney or attorneys filing the lawsuits;
transmitting the publicly available data obtained from the court records of each court of law of the plurality of courts of law to a database, said step of transmitting the publicly available data obtained from the court records of each court of law of the plurality of courts of law includes transmitting data indicative of the identity of the plaintiff, the identity of the defendant, the cause of action, and the identity of the attorney or attorneys filing the lawsuits; and
transmitting at least a portion of the data from the database over a network to terminals which access the database over the network.

2. A method as set forth in claim 1 wherein said step of reviewing court records of a plurality of courts of law includes determining the disposition of lawsuits filed in each court of law of the plurality of courts of law, and said step of transmitting the publicly available data obtained from the court records of each court of law of the plurality of courts of law includes transmitting data indicative of the disposition of lawsuits filed in each court of law of the plurality of courts of law to the database.

Lines 44-54, rewrite claims 4 and 5 as follows:

4. A method as set forth in claim 1 wherein said step of reviewing court records of a plurality of courts of law includes visual reviewing the court records and manually copying the publicly available data from the court records of each court of law of the plurality of courts of law.

5. A method as set forth in claim 1 wherein said step of reviewing court records of a plurality of courts of law includes electronically reading data from an electronic version of the court records of each court of law of the plurality of courts of law, and said step of transmitting the publicly available data obtained from the court records of each court of law of the plurality of courts of law includes electronically transmitting the publicly available data to a data storage device.

Column 12,
Lines 44-61, rewrite claims 25 and 26 as follows:

25. A method as set forth in claim 1 wherein said step of reviewing court records further includes determining, from the publicly available data, the identity of expert witnesses for each of a plurality of different causes of action in a plurality of courts, and said step of transmitting at least a portion of the data from the database includes transmitting data from the database to at least one of the terminals indicative of the identity of expert witnesses for at least one cause of action of the plurality of different causes of action.

UNITED STATES PATENT AND TRADEMARK OFFICE
CERTIFICATE OF CORRECTION

| | |
|---|---|
| PATENT NO. | : 6,901,404 B1 |
| DATED | : May 31, 2005 |
| INVENTOR(S) | : Peter M. Bonutti |

It is certified that error appears in the above-identified patent and that said Letters Patent is hereby corrected as shown below:

Column 12 (cont'd),

26. A method as set forth in claim 1 wherein said step of reviewing court records further includes determining, from the publicly available data, the identity of expert witnesses for each of a plurality of different causes of action in a plurality of different courts, said method further includes the step of determining the number of lawsuits which resulted in favorable decisions for a litigant assisted by each expert witness, and said step of transmitting at least a portion of the data from the database includes transmitting data from the database to at least one of the terminals indicative of the identity of expert witnesses for each cause of action of the plurality of causes of action and the number of lawsuits which resulted in favorable decisions for a litigant assisted by each expert witness.

Column 13, line 30 through Column 14, line 40,
Rewrite claims 30 through 39 as follows:

30. A method as set forth in claim 1 wherein said step of transmitting the publicly available data obtained from the court records includes transmitting data relating to lawsuits filed within a period of time in each of a plurality of courts of law in each of a plurality of states of the United States of America to the database.

31. A method as set forth in claim 1 wherein said step of reviewing court records of a plurality of courts of law includes reviewing court records in both state and federal courts, and said step of transmitting the publicly available data obtained from the court records includes transmitting data relating to both federal and state courts.

32. A method as set forth in claim 1 wherein said step of transmitting the publicly available data obtained from the court records includes electronically reading data from an electronic version of the court records of each court of the plurality of courts in each of a plurality of states of the United States of America and electronically transmitting at least a portion of the electronically read data from each of the courts of the plurality of courts to the database.

33. A method as set forth in claim 1 wherein said step of reviewing court records includes viewing the court records and manually copying the publicly available data from the court records in each court of the plurality of courts in each of a plurality of states of the United States of America.

34. A method as set forth in claim 1 said step of transmitting the publicly available data obtained from the court records includes transmitting data relating to lawsuits filed in state and federal courts in at least a portion of at least one state of the United States of America to the database.

UNITED STATES PATENT AND TRADEMARK OFFICE
CERTIFICATE OF CORRECTION

PATENT NO. : 6,901,404 B1
DATED : May 31, 2005
INVENTOR(S) : Peter M. Bonutti

It is certified that error appears in the above-identified patent and that said Letters Patent is hereby corrected as shown below:

Column 13, line 30 through Column 14, line 40 (cont'd),

35. A method of disseminating information relating to litigation in a plurality of courts of law, said method comprising the steps of:
reviewing court records of a plurality of courts of law to obtain publicly available data relating to lawsuits filed in each of the plurality of courts of law, said step of reviewing court records of a plurality of courts of law includes determining the identity of expert witnesses and the causes of action in regard to which the expert witnesses testified;
transmitting the publicly available data obtained from the court records of each court of law of the plurality of courts of law to a database, said step of transmitting the publicly available data obtained from the court records of each court of law of the plurality of courts of law includes transmitting data indicative of the identity of the expert witnesses and the causes of action in regard to which the expert witnesses testified; and
transmitting at least a portion of the data from the database over a network to terminals which access the database over the network.

36. A method as set forth in claim 35 wherein said step of reviewing court records of a plurality of courts of law includes determining the identity of the plaintiff, the identity of the defendant, and the cause of action for each of the lawsuits filed in the plurality of courts of law, and said step of transmitting the publicly available data obtained from the court records of each court of law of the plurality of courts of law includes transmitting data indicative of the identity of the plaintiff, the identity of the defendant and the cause of action for lawsuits filed in the plurality of courts of law to the database.

37. A method as set forth in claim 35 wherein said step of reviewing court records of a plurality of courts of law includes determining the disposition of lawsuits filed in each court of law of the plurality of courts of law, and said step of transmitting the publicly available data obtained from the court records of each court of law of the plurality of courts of law includes transmitting data indicative of the disposition of lawsuits filed in each court of law of the plurality of courts of law to the database.

38. A method as set forth in claim 35 wherein said step of reviewing court records of a plurality of courts of law includes determining the identity of the attorney or attorneys filing lawsuits and the cause of action for lawsuits in each court of law of the plurality of courts of law, and said step of transmitting the publicly available data obtained from the court records of each court of law of the plurality of courts of law includes transmitting data indicative of the identity of the attorney or attorneys filing lawsuits and the causes of action for lawsuits filed in each of the plurality of courts of law to the database.

39. A method as set forth in claim 35 wherein said step of reviewing court records of a plurality of courts of law includes determining the disposition of lawsuits filed in each court of law of the plurality of courts of law, and said step of transmitting the publicly available data obtained from the court records of each court of law of the plurality of courts of law includes transmitting data indicative of the disposition of lawsuits filed in each court of law of the plurality of courts of law to the database.

UNITED STATES PATENT AND TRADEMARK OFFICE
CERTIFICATE OF CORRECTION

| | | |
|---|---|---|
| PATENT NO. | : 6,901,404 B1 | |
| DATED | : May 31, 2005 | |
| INVENTOR(S) | : Peter M. Bonutti | |

It is certified that error appears in the above-identified patent and that said Letters Patent is hereby corrected as shown below:

Column 14, line 49 through Column 15, line 10,
Rewrite claims 41 through 44 as follows:

41. A method as set forth in claim 35 wherein said step of reviewing court records of a plurality of courts of law includes reviewing the court records and manually copying the publicly available data from the court records of each court of law of the plurality of courts of law.

42. A method as set forth in claim 35 wherein said step of reviewing court records of a plurality of courts of law includes electronically reading data from an electronic version of the court records of each court of law of the plurality of courts of law, and said step of transmitting the publicly available data obtained from the court records of each court of law of the plurality of courts of law includes electronically transmitting the publicly available data to a data storage device.

43. A method as set forth in claim 35 wherein said step of transmitting at least a portion of the data from the database includes transmitting data indicative of whether or not an expert witness testified on behalf of a litigant who received a favorable decision in the litigation in which the expert witness testified.

44. A method as set forth in claim 35 further including the steps of determining a relationship between a number corresponding to the number of lawsuits in which one expert witness testified and a number corresponding to the number of lawsuits in which the one expert witness testified and which were decided in favor of a litigant on whose behalf the one expert witness testified, and transmitting data from the database to at least one of the terminals indicative of the relationship between the number of lawsuits in which the one expert witness testified and the number of lawsuits in which the one expert witness testified and which were decided in favor of a litigant on whose behalf the one expert witness testified.

Column 16,
Lines 10-11, the phrase "A method as set forth in claim 45 wherein the documents include complaints, answers, and motions filed by the parties." should read
-- A method as set forth in claim 45 wherein the documents include complaints. --.

UNITED STATES PATENT AND TRADEMARK OFFICE
CERTIFICATE OF CORRECTION

PATENT NO. : 6,901,404 B1
DATED : May 31, 2005
INVENTOR(S) : Peter M. Bonutti

It is certified that error appears in the above-identified patent and that said Letters Patent is hereby corrected as shown below:

Column 16 (cont'd),
Line 14, change "motion" to -- motions --.

Signed and Sealed this

Sixth Day of December, 2005

JON W. DUDAS
*Director of the United States Patent and Trademark Office*